(12) United States Patent
Gilliand

(10) Patent No.: US 12,158,358 B2
(45) Date of Patent: Dec. 3, 2024

(54) VEHICLE LEVELING DEVICE AND METHOD

(71) Applicant: Christopher Dennis Gilliand, Decatur, AL (US)

(72) Inventor: Christopher Dennis Gilliand, Decatur, AL (US)

(*) Notice: Subject to any disclaimer, the term of this patent is extended or adjusted under 35 U.S.C. 154(b) by 345 days.

(21) Appl. No.: 17/763,107

(22) PCT Filed: Sep. 23, 2020

(86) PCT No.: PCT/US2020/052312
§ 371 (c)(1),
(2) Date: Mar. 23, 2022

(87) PCT Pub. No.: WO2021/061848
PCT Pub. Date: Apr. 1, 2021

(65) Prior Publication Data
US 2022/0357156 A1 Nov. 10, 2022

Related U.S. Application Data

(60) Provisional application No. 62/904,426, filed on Sep. 23, 2019.

(51) Int. Cl.
*G01C 9/28* (2006.01)
*B60S 5/00* (2006.01)
(Continued)

(52) U.S. Cl.
CPC .............. *G01C 9/28* (2013.01); *B60S 5/00* (2013.01); *B60S 9/04* (2013.01); *B60S 9/12* (2013.01); *B66F 3/46* (2013.01); *B66F 3/35* (2013.01)

(58) Field of Classification Search
CPC ..... B60S 9/04; B60S 9/12; B66F 3/46; G01C 9/28
(Continued)

(56) References Cited

U.S. PATENT DOCUMENTS 3,445,936 A * 5/1969 Wilkerson ........... G01B 11/275
33/336
4,330,945 A * 5/1982 Eck ....................... G01B 5/0025
248/231.51
(Continued)

OTHER PUBLICATIONS

"Water Level (device)" (Wikipedia) [online] (retrieved from the internet on Jan. 5, 2021)<URL https://web.archive.org/web/20151126045829/https://en.wikipedia.org/wiki/Water_level_(device)>, Nov. 26, 2015 (Nov. 26, 2015); entire document, especially Fig. 1.

*Primary Examiner* — George B Bennett
(74) *Attorney, Agent, or Firm* — Jonathan M. D'Silva; MMI Intellectual Propert

(57) ABSTRACT

A vehicle leveling device for ensuring that a vehicle is level for calibration of sensors that are installed on the vehicle is presented. A lifting jack is placed under each of the vehicle's wheels and a mounting clamp is mounted to each wheel. Each mounting clamp has a sizing frame having two ends, a clamping member slidably mounted upon each end of the sizing frame and a pair of pivotally mounted engagement hooks. A support member mounted central to the sizing frame that supports an indicator that allows a level reading to be taken. The lifting jacks may be actuated under each of the vehicle's wheels as needed the ever level indicator reads the same indicating that each wheel is coplanar and the vehicle is level.

15 Claims, 21 Drawing Sheets

(51) Int. Cl.
   *B60S 9/04*   (2006.01)
   *B60S 9/12*   (2006.01)
   *B66F 3/46*   (2006.01)
   *B66F 3/35*   (2006.01)

(58) Field of Classification Search
   USPC .................................. 33/203, 203.15, 288
   See application file for complete search history.

(56) References Cited

U.S. PATENT DOCUMENTS

| | | | |
|---|---|---|---|
| 4,404,838 A | 9/1983 | Hare | |
| 4,413,420 A | 11/1983 | Hoffman et al. | |
| 4,679,327 A * | 7/1987 | Fouchey | G01B 7/315 |
| | | | 33/203.13 |
| 5,056,233 A * | 10/1991 | Hechel | G01B 11/2755 |
| | | | 33/286 |
| 5,531,030 A * | 7/1996 | Dale, Jr. | G01B 11/2755 |
| | | | 33/203.18 |
| 5,915,700 A * | 6/1999 | Schneider | B60S 9/12 |
| | | | 280/6.155 |
| 6,315,079 B1 * | 11/2001 | Berends | B66F 3/46 |
| | | | 414/427 |
| 8,104,185 B2 * | 1/2012 | Gray | G01B 5/255 |
| | | | 33/203.18 |
| 8,448,342 B2 * | 5/2013 | Nobis | G01B 11/2755 |
| | | | 33/203.18 |
| 10,427,654 B2 * | 10/2019 | Garceau | G05B 11/01 |
| 11,174,139 B2 * | 11/2021 | Stapensea | B66F 9/20 |
| 11,702,045 B2 * | 7/2023 | Jackson, Jr. | B60S 5/00 |
| | | | 33/288 |
| 2006/0045683 A1 | 3/2006 | Huiming et al. | |
| 2006/0255563 A1 | 11/2006 | Kartiala | |
| 2008/0289202 A1 * | 11/2008 | Kassouf | G01B 11/2755 |
| | | | 33/203.18 |
| 2009/0031782 A1 | 2/2009 | Jackson et al. | |
| 2018/0170323 A1 * | 6/2018 | Darius | B60S 9/12 |
| 2020/0223675 A1 * | 7/2020 | Wen | B66F 9/063 |
| 2022/0017020 A1 * | 1/2022 | McFadden | B60R 9/08 |
| 2023/0150805 A1 * | 5/2023 | de Jong | B66F 17/006 |
| | | | 254/89 R |

* cited by examiner

58c

58c

VEHICLE LEVELING DEVICE AND METHOD

BACKGROUND

Modern vehicles have a variety of sensors and equipment that require routine calibration and maintenance to keep them in proper operating condition. These systems are collectively referred as Advanced Driver Assist Systems (ADAS) and include such systems as: blind spot alert, lane departure warning, lane keeping assist, pedestrian detection, road sign detection, forward/rear emergency braking, adaptive cruise control, auto parking, rear park assist, night vision, 360° viewing, etc. These ADAS systems include sensors and computer systems that are complicated and sensitive and have very specific requirements for repair after vehicles incur damage from collisions or other accidents. Many repair shops do not have the equipment or adequate space to perform testing and calibration required to ensure that the repairs and maintenance are done correctly. What is presented is a system and method that allows for such calibration to be performed in locations that would otherwise not be possible or would require significant upgrades to even allow such calibration to take place.

SUMMARY

A vehicle leveling device is presented for ensuring that a vehicle is level for calibration of sensors that are installed on the vehicle. The vehicle leveling device comprises a lifting jack under each of the vehicle's wheels. A mounting clamp is mounted to each of the vehicle's wheels. Each mounting clamp further comprises a sizing frame having two ends, a clamping member slidably mounted upon each end of the sizing frame, with each clamping member having at least two pivotally mounted engagement hooks. An actuating member on said sizing frame draws the clamping members towards or away from each other such that the engagement hooks may grip or release the rim of the wheel to which the mounting clamp is mounted. A support member is mounted central to the sizing frame. In some embodiments, a telescoping leveling frame comprising a series of interlocking tubes is arranged to form a frame that surrounds the vehicle. The telescoping leveling frame is mounted to each support member of each mounting clamp. A plurality of bubble levels are mounted to the telescoping leveling frame. The lifting jacks may be actuated under each of the vehicle's wheels such that each bubble level on the leveling frame becomes centered indicating that each wheel is coplanar and the vehicle is level.

The bubble levels may be slidably mounted onto the telescoping leveling frame. In some embodiments, the lifting jack may be mechanically, pneumatically, or hydraulically actuated to lift each wheel. In some embodiments, the clamping members are mechanically, pneumatically, or hydraulically actuated towards or away from each other. The telescoping leveling frame may comprise pins and holes for adjustment of the telescoping leveling frame around the vehicle.

In another embodiment of vehicle leveling device the support member mounted central to the sizing frame supports an indicator for a liquid level that is in fluid connection with the other indicators on all other mounting clamps on each of the vehicle's other wheels with enough liquid that a level reading can be taken at each indicator. In this embodiment, the lifting jacks may be actuated under each of the vehicle's wheels such that the height of the liquid in each indicator is equal signifying that each wheel is coplanar and the vehicle is level. A bubble level may be incorporated into the indicator to ensure that the indicator is completely vertical. The liquid in the indicator may be water, antifreeze, or alcohol and may be colored with a dye to make it easier to see. The indicators may be in fluid connection in any way that is acceptable but it is preferred that they are connected with a series of hoses connected to each indicator for ease of transport. A shutoff valve may be incorporated into the indicators to drain or add liquid to the vehicle leveling device.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
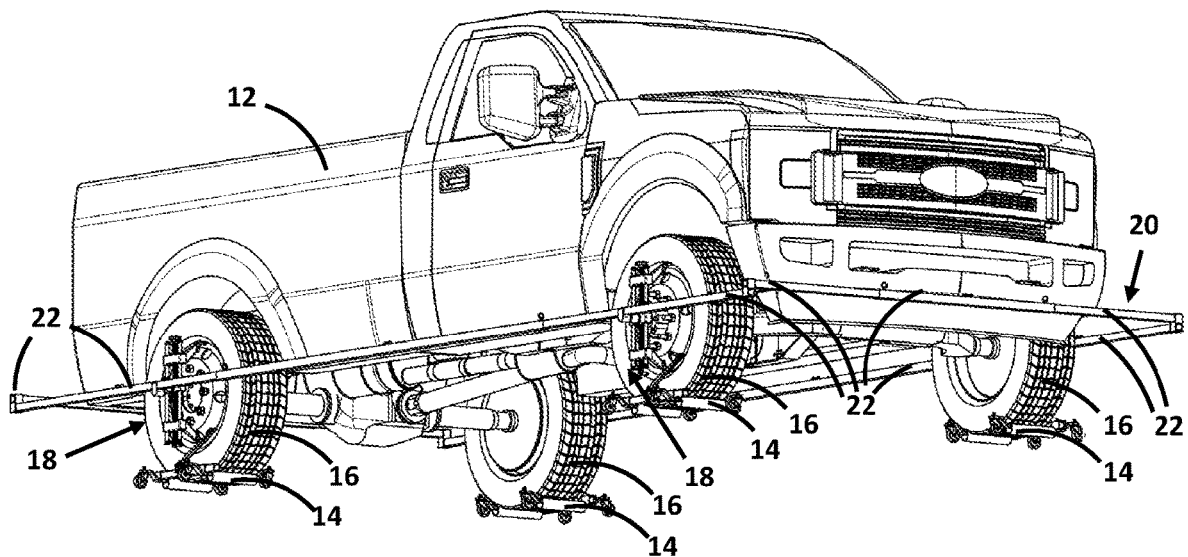
FIG. 1 is a perspective view of the vehicle leveling device assembled on a vehicle.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

ADAS systems in modern vehicles are an increasing important part of the reason that a customer purchases a vehicle. They are value added systems for which the manufacturer can charge a premium and help the vehicle retain its value. These systems add complexity to the vehicle for both maintenance and repair. Some of these systems are very sensitive and damage from even minor bumps can disrupt their calibration and significantly impair performance. Recalibration and repair require that trained technicians perform repairs and that the vehicle be perfectly level. There are also minimum space requirements to adequately test sensor range and acuity. For example, the shop floors cannot be uneven, and the calibration should be conducted in a room that is at least 30 feet by 30 feet with no windows or metal poles, with white or tan colored walls, a neutral colored floors and controlled lighting. Even if there is adequate space available, many older repair shops have uneven floors that would require significant investment to level or require the use of expensive leveling racks that are outside the budget of many repair shops. The systems and method presented herein allow vehicles to be made level quickly and cost effectively on uneven surfaces with no expensive capital investment.

FIG. 1 shows a perspective view vehicle leveling device 10 for ensuring that a vehicle 12 is level for calibration of sensors that are installed on the vehicle 12. Lifting jacks 14 are placed under each of the wheels 16 of the vehicle 12. The view in FIG. 1 is rotated for easier viewing, but it is to be understood that the entire vehicle leveling device 10 is placed on the ground in the area in which the on-board sensors of the vehicle 12 are to be calibrated. A mounting clamp 18 is mounted to each wheel 16. A telescoping leveling frame 20 comprising a series of interlocking tubes 22 is arranged to form a frame that surrounds the vehicle 12. As will be discussed in more detail later, the telescoping leveling frame 20 is mounted to the mounting clamps 18 on each wheel 16.

Figure 2:
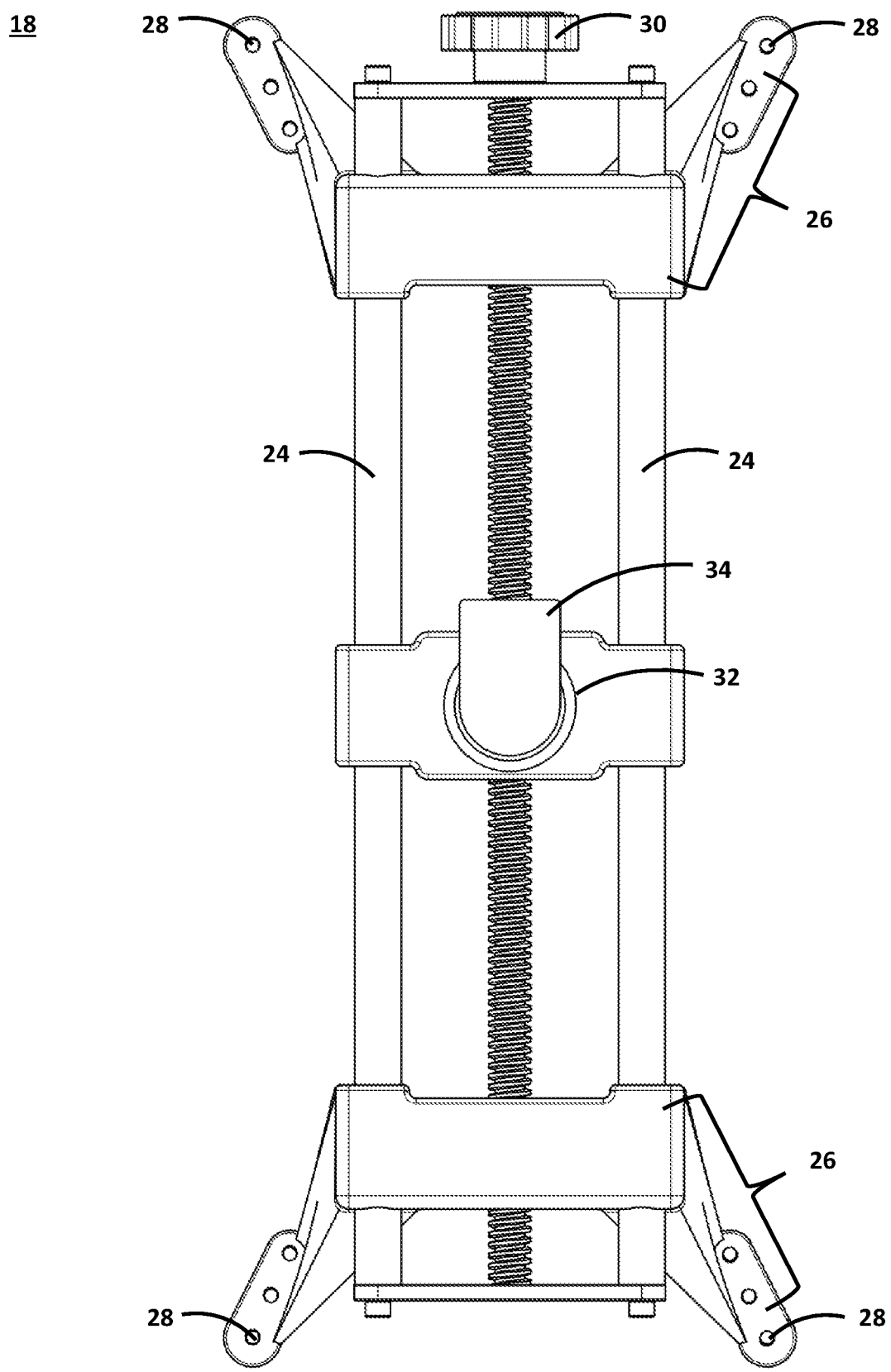
FIG. 2 is a front view of the mounting clamp for an embodiment of vehicle leveling device.
Figure 3:
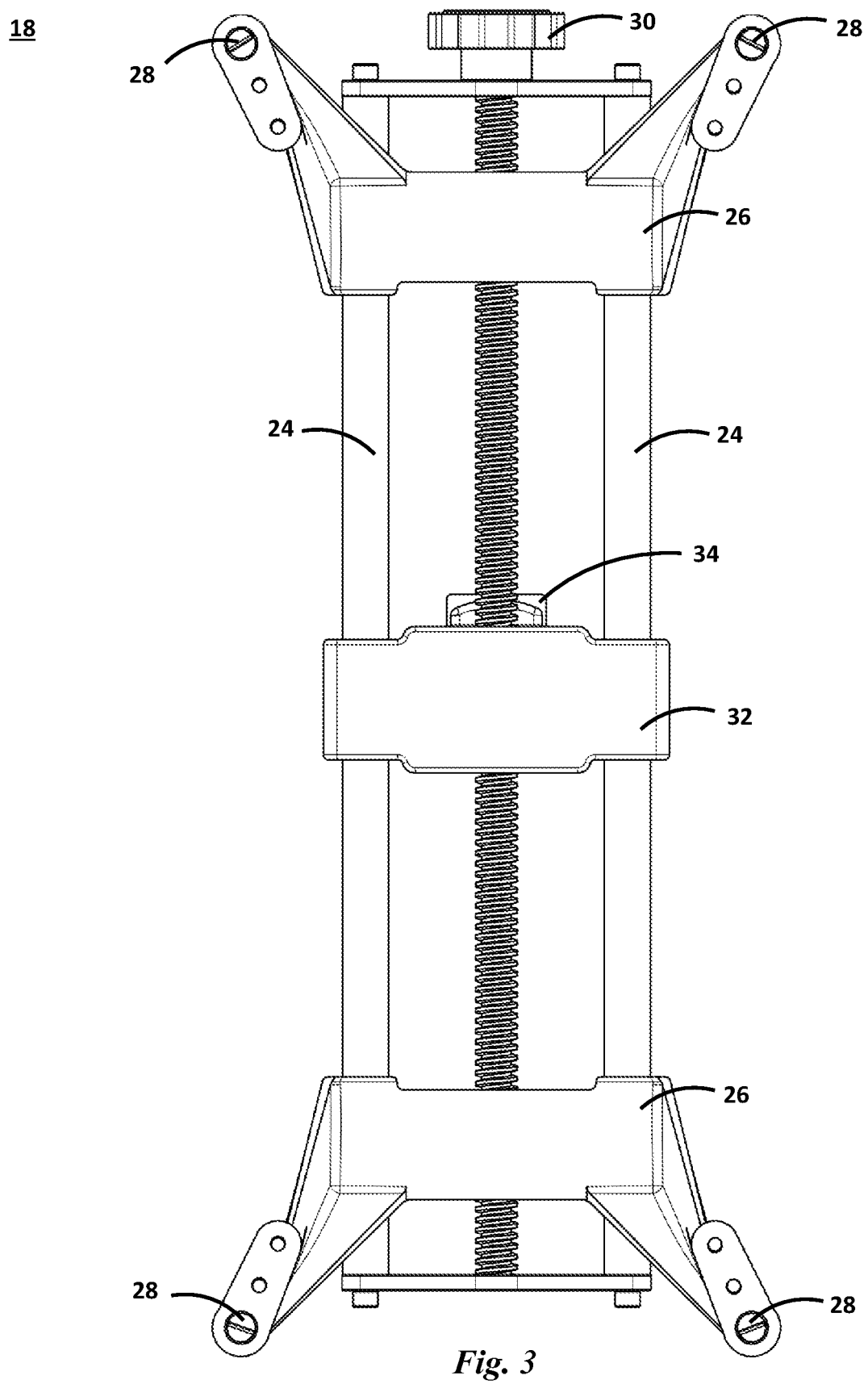
FIG. 3 is a rear view of the mounting clamp of FIG. 1.
Figure 4:
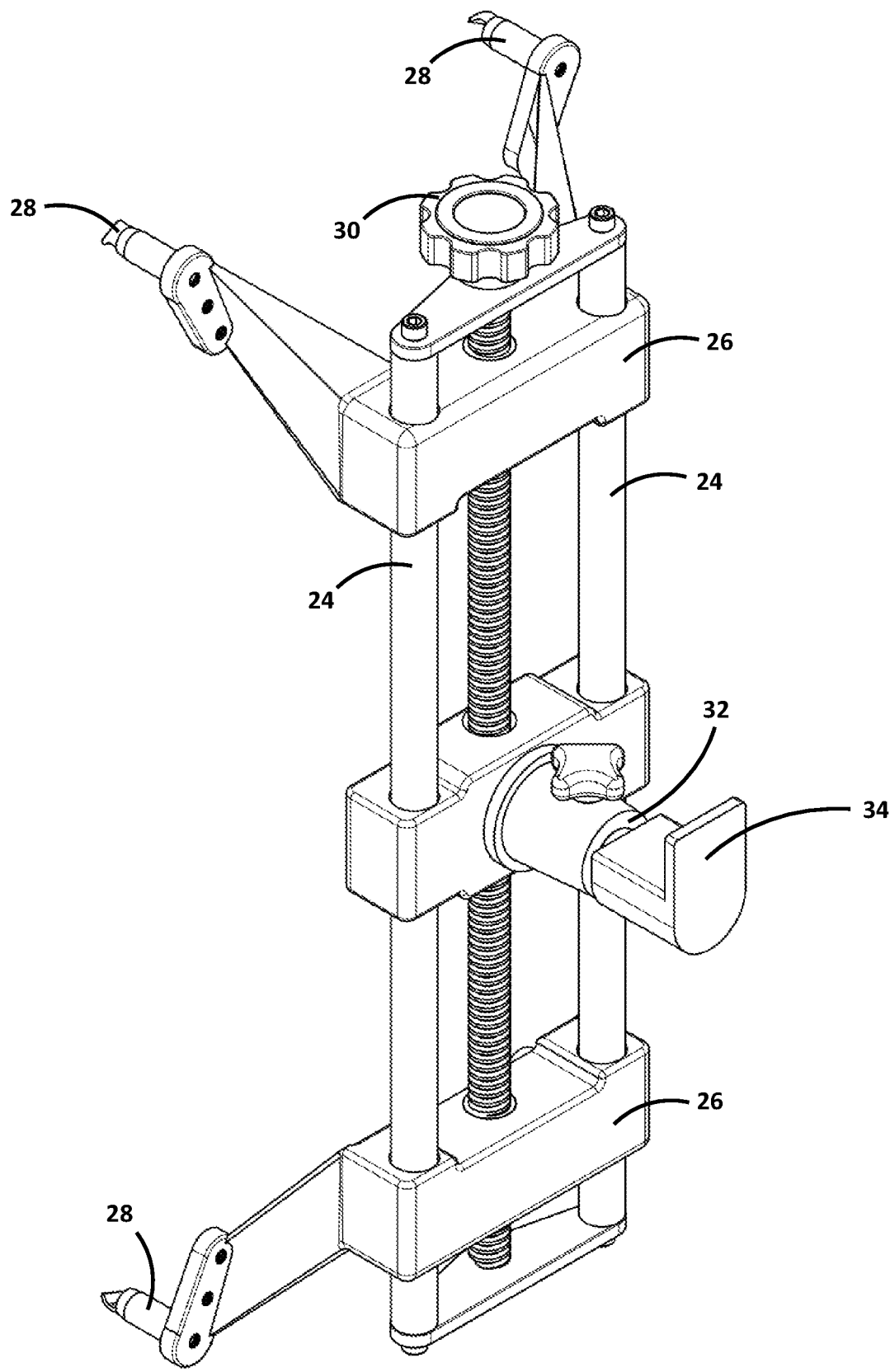
FIG. 4 is a perspective view of the mounting clamp of FIG. 1.
Figure 5:
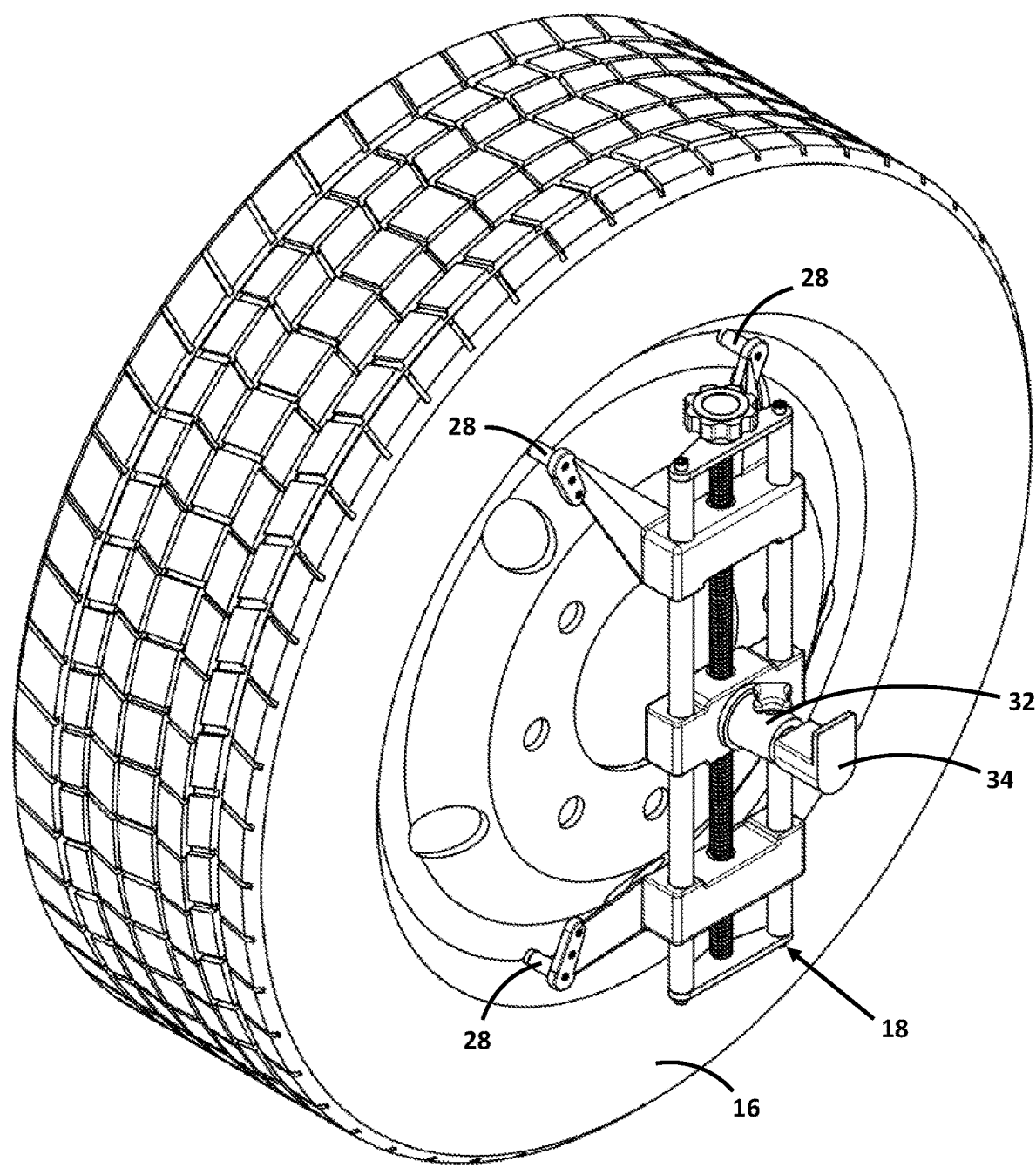
FIG. 5 is a perspective view of the mounting clamp attached to the rim of a wheel of a vehicle.

As best seen in FIGS. 2, 3, and 4, each mounting clamp 18 comprises a sizing frame 24 having two ends. A clamping member 26 is slidably mounted upon each end of the sizing frame 24. Each clamping member 26 has at least two pivotally mounted engagement hooks 28. An actuating member 30 on the sizing frame 24 can be actuated to draw the clamping members 26 towards or away from each other. A support member 32 is mounted central to the sizing frame 24. In this embodiment, a hook 34 that forms a small shelf is mounted to the support member 32. FIG. 5 shows how the mounting clamp 18 is mounted to a wheel 16. The actuating member 30 is engaged to draw the clamping members 26 apart and the engagement hooks 28 are aligned on the rim of the wheel 16. The actuating member 30 is then engaged to draw the clamping members 26 together and the engagement hooks 28 then grip rim of the wheel 12 to which the mounting clamp 18 is mounted to secure it in place. The clamping members 26 shown are mechanically, actuated but they also be pneumatically, or hydraulically actuated towards or away from each other. The engagement hooks 28 may be made of plastic, nylon, aluminum, or a corrosion resistant metal.

Figure 6:
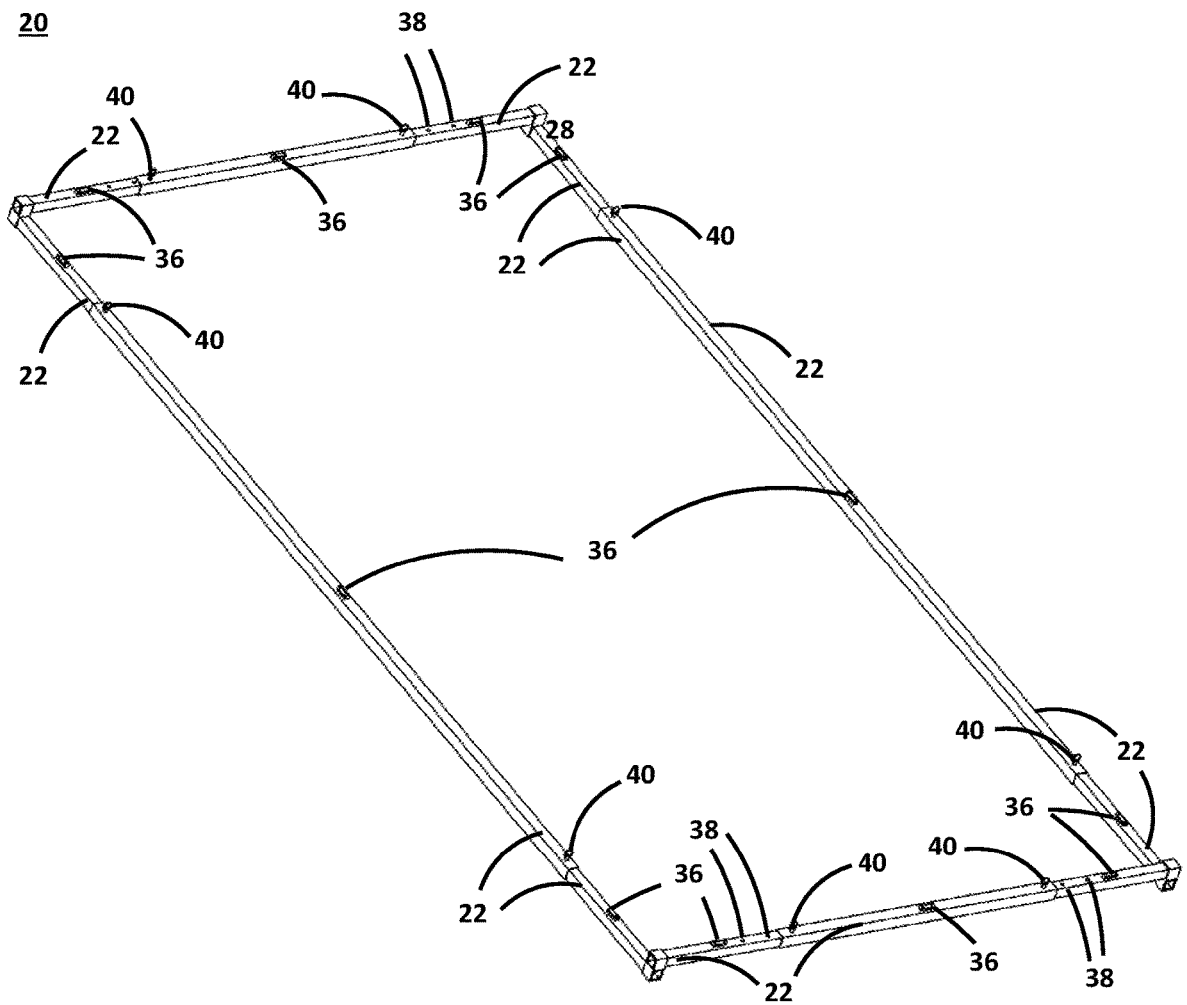
FIG. 6 is a perspective view of the telescoping leveling frame of the vehicle leveling device.
Figure 7:
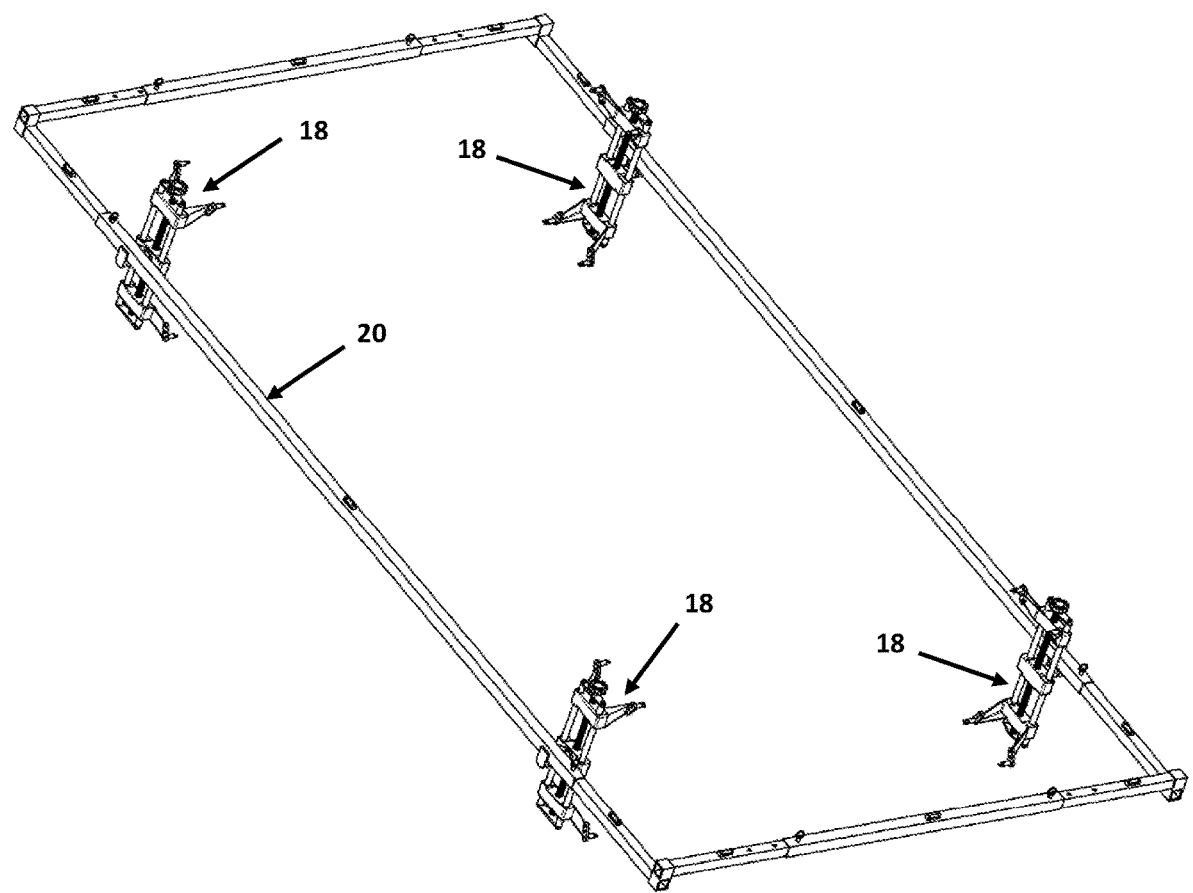
FIG. 7 is a perspective view of the telescoping leveling frame of FIG. 1 supported by four mounting clamps.
Figure 8:
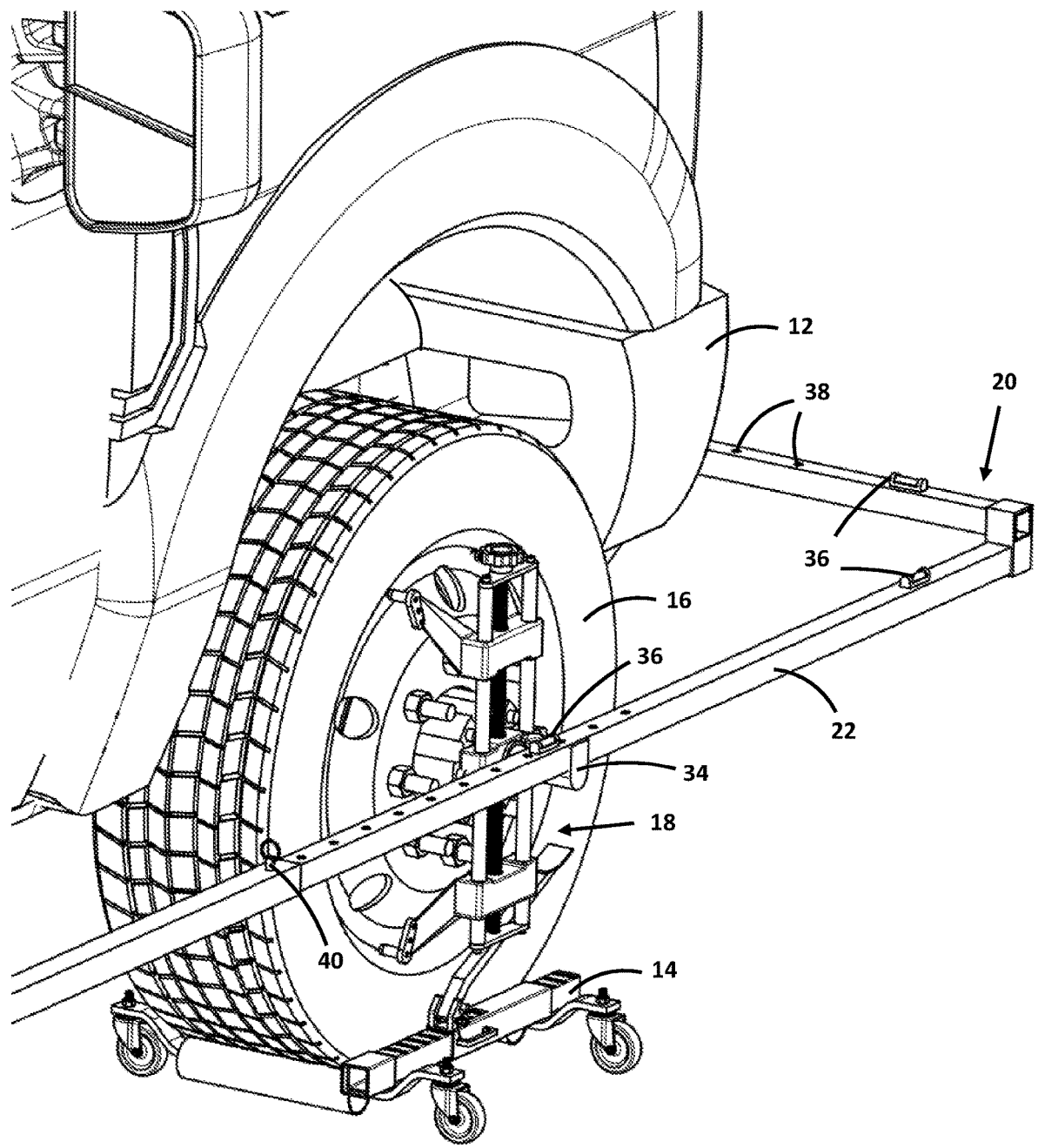
FIG. 8 is a close-up perspective view of a vehicle wheel with the vehicle leveling device mounted to it.
Figure 9:
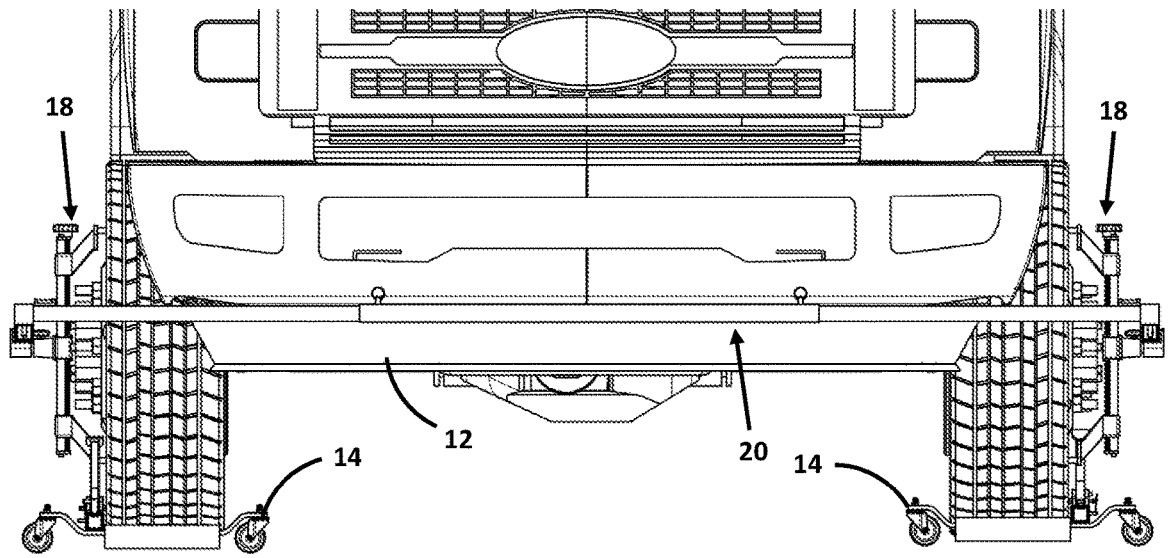
FIG. 9 is a front view of the vehicle leveling device assembled on a vehicle of FIG. 8.
Figure 10:
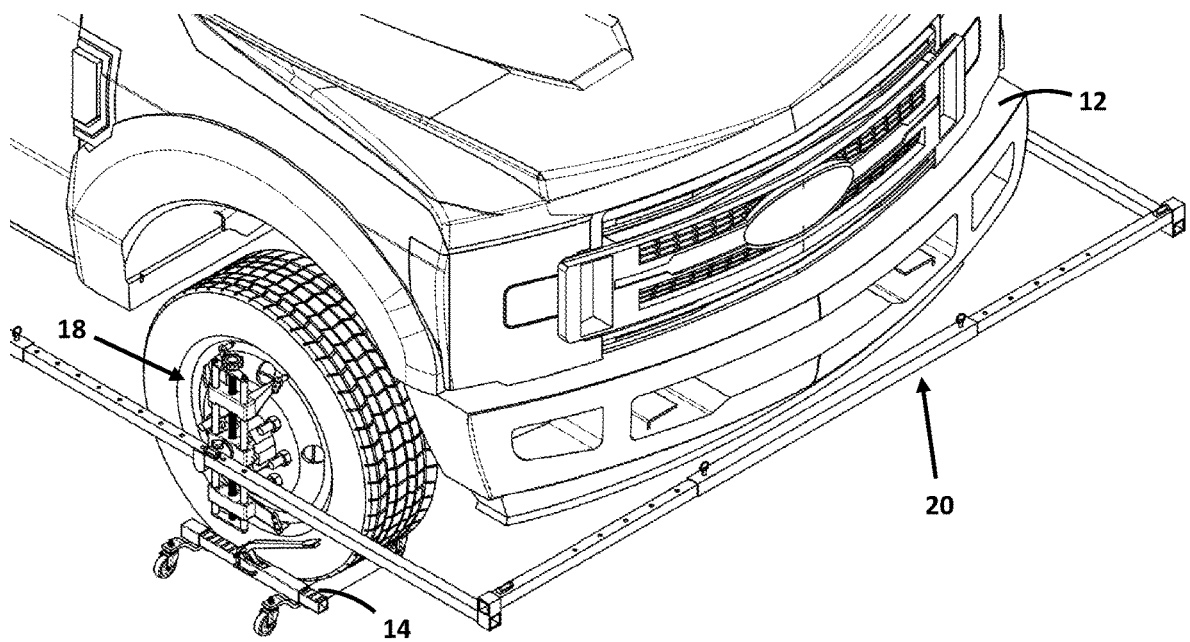
FIG. 10 is a downwards perspective view of the vehicle leveling device assembled on a vehicle of FIG. 8.

FIG. 6 shows the assembled telescoping leveling frame 20 that is formed from a series of interlocking tubes 22 arranged to form a frame that is sized to surrounds the vehicle 12 (as seen in FIG. 1). A plurality of bubble levels 36 are mounted to the leveling frame 20 to, in effect, surround the vehicle. In some embodiments, the bubble levels 36 may be are slidably mounted onto the leveling frame 20 so that the position of the bubble level can be adjusted for the user. In the embodiment shown, holes 38 and pins 40 are incorporated into the interlocking tubes 22 that allow adjustment of the size of the leveling frame 20 to fit around vehicles of different sizes. The bubble levels 36 may also be replaced with any other type of level indicator such as lasers. For illustration purposes, FIG. 7 shows that the assembled leveling frame 20 is mounted to the hook 34 on each support member 32 of each mounting clamp 18. In actuality, the mounting clamps 18 are installed on the wheels 16 of a vehicle as shown in FIGS. 1, 8, 9, and 10.

As best understood by referring to FIGS. 1 and 8-12, the leveling device 10 is operated as follows: first a lifting jack 14 is placed under each wheel 16 of the vehicle 12. A mounting clamp 18 is installed on the rim of each wheel 16 such that the support member 32 is centered with each wheel. The leveling frame 20 is assembled around the vehicle 12 and mounted to each support member 32. The bubble levels 36 around the leveling frame 20 are read and, as shown for example in FIG. 11, if the bubble level 36 shows a tilt, each lifting jack 14 may be actuated under each wheel 16 until each bubble level 36 on the leveling frame 20 becomes centered indicating that each wheel 16 is coplanar and the vehicle 12 is level as shown in FIG. 12. Preferably, each lifting jack 14 is actuated to move a small amount each time. Once levelled, the lifting jacks 14 are left in place, the levelling frame 20 is removed from the support members 32 and the mounting clamps 18 are removed from the wheels 16. The technician may then calibrate the onboard sensors in the vehicle 12. The leveling device 10 shown and described has leveled vehicles of less than one inch over a 7-inch grade.

Figure 11:
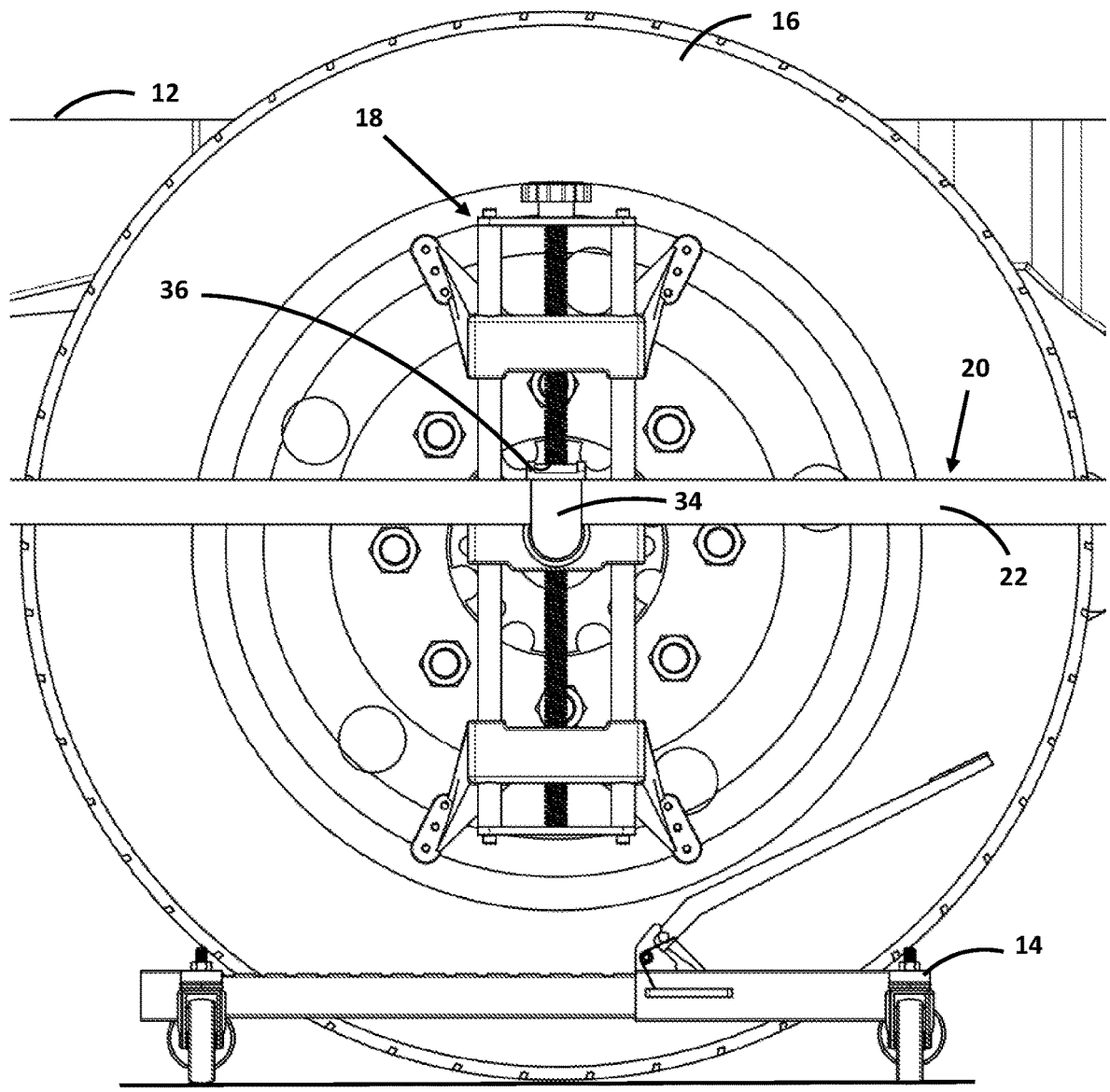
FIG. 11 is a front view of the wheel of FIG. 8 before leveling with a mechanical lifting jack.
Figure 12:
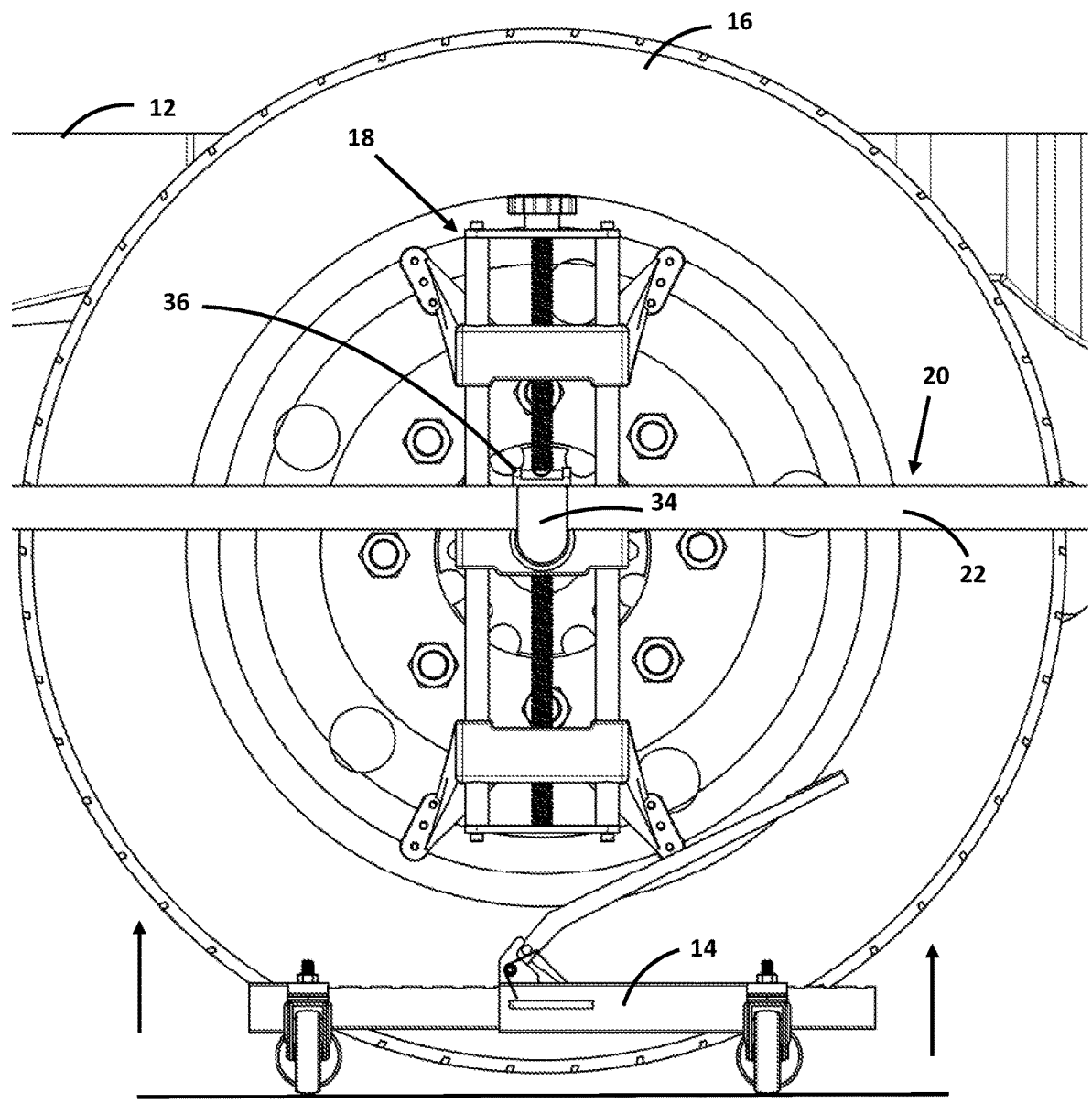
FIG. 12 is a front view of the wheel of FIG. 8 after being leveled with a mechanical lifting jack.
Figure 13:
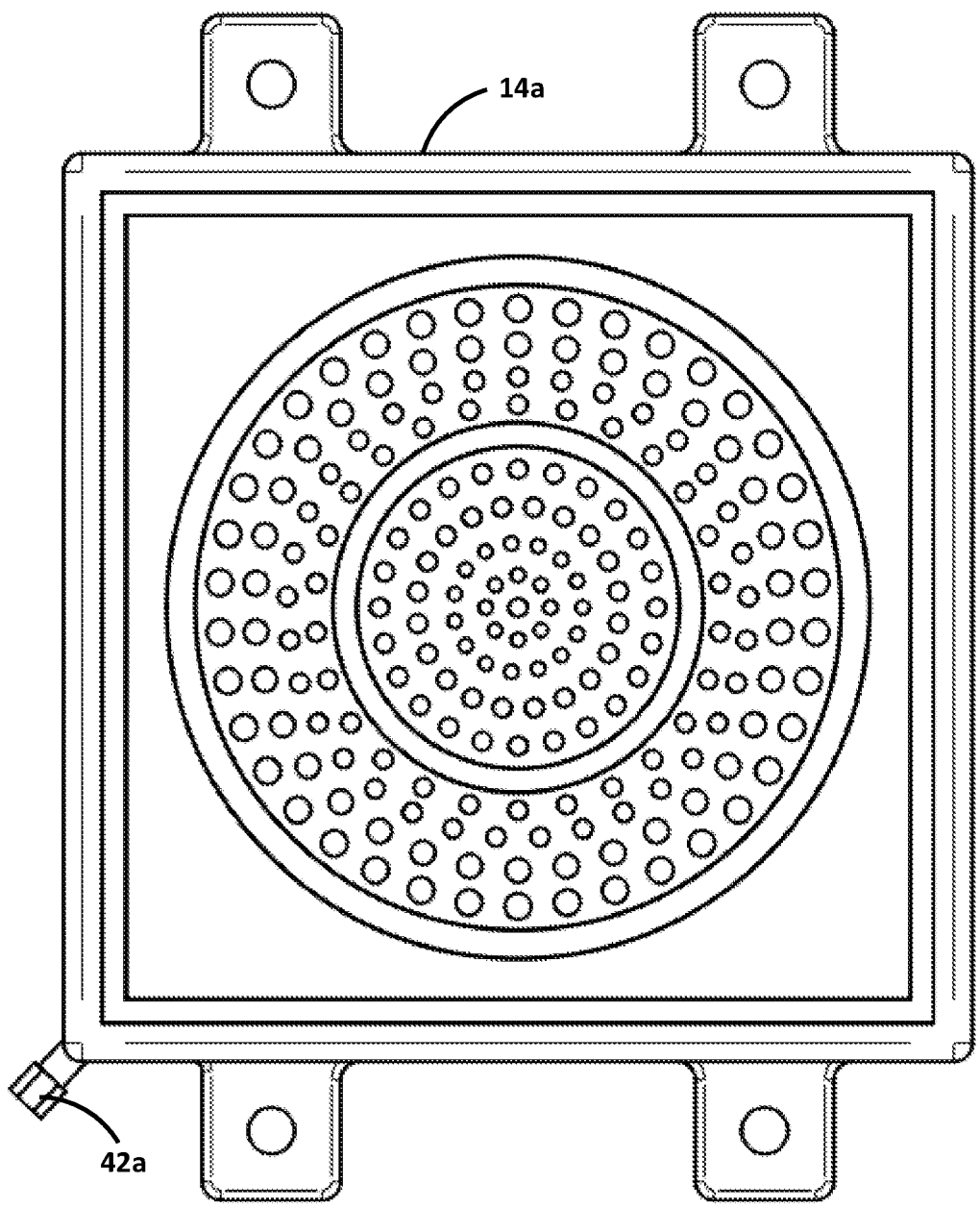
FIG. 13 is a top view of an air bag lifting jack.
Figure 14:
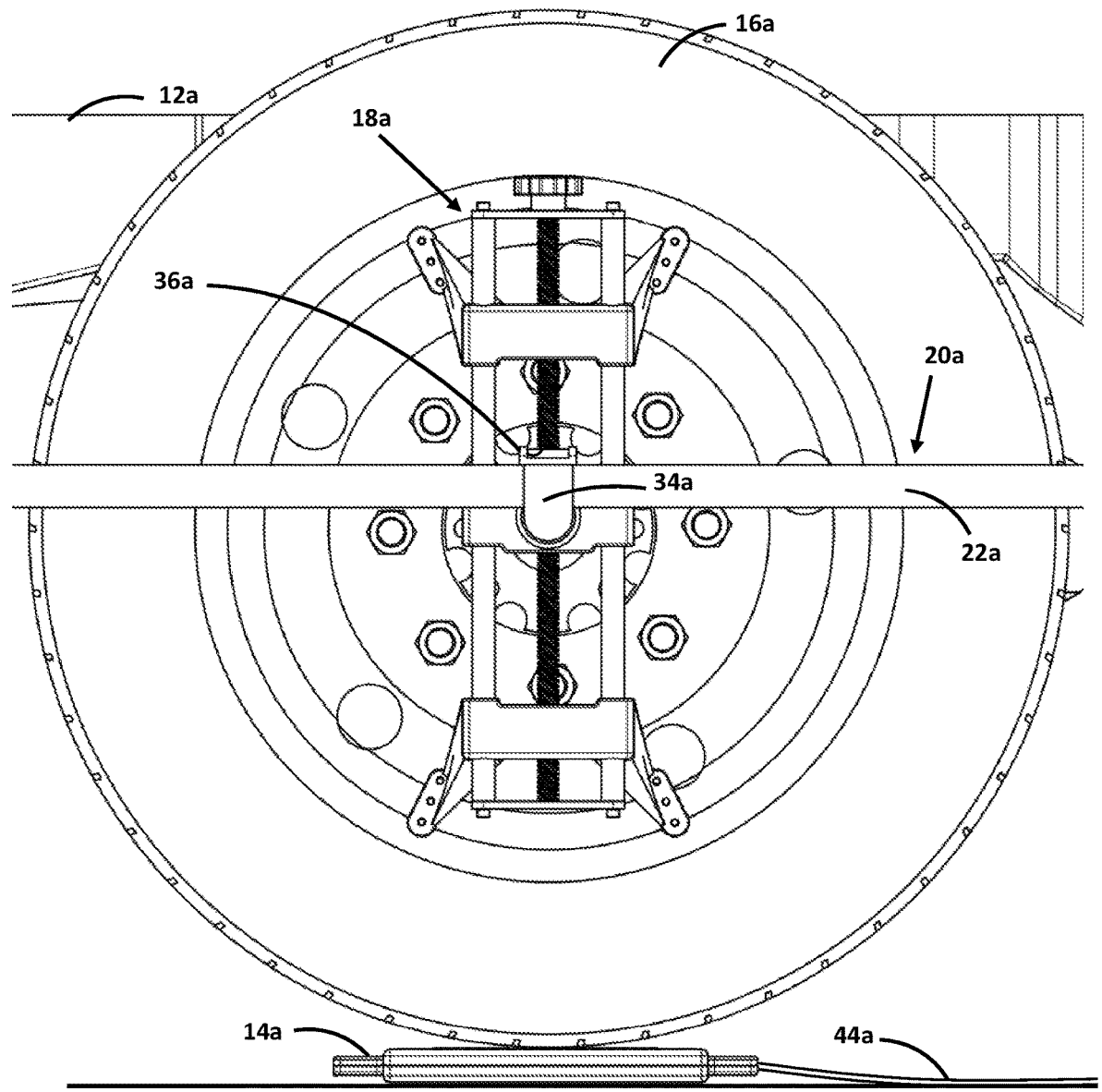
FIG. 14 is a front view of a vehicle leveling device on a wheel before being leveled with an air bag lifting jack.
Figure 15:
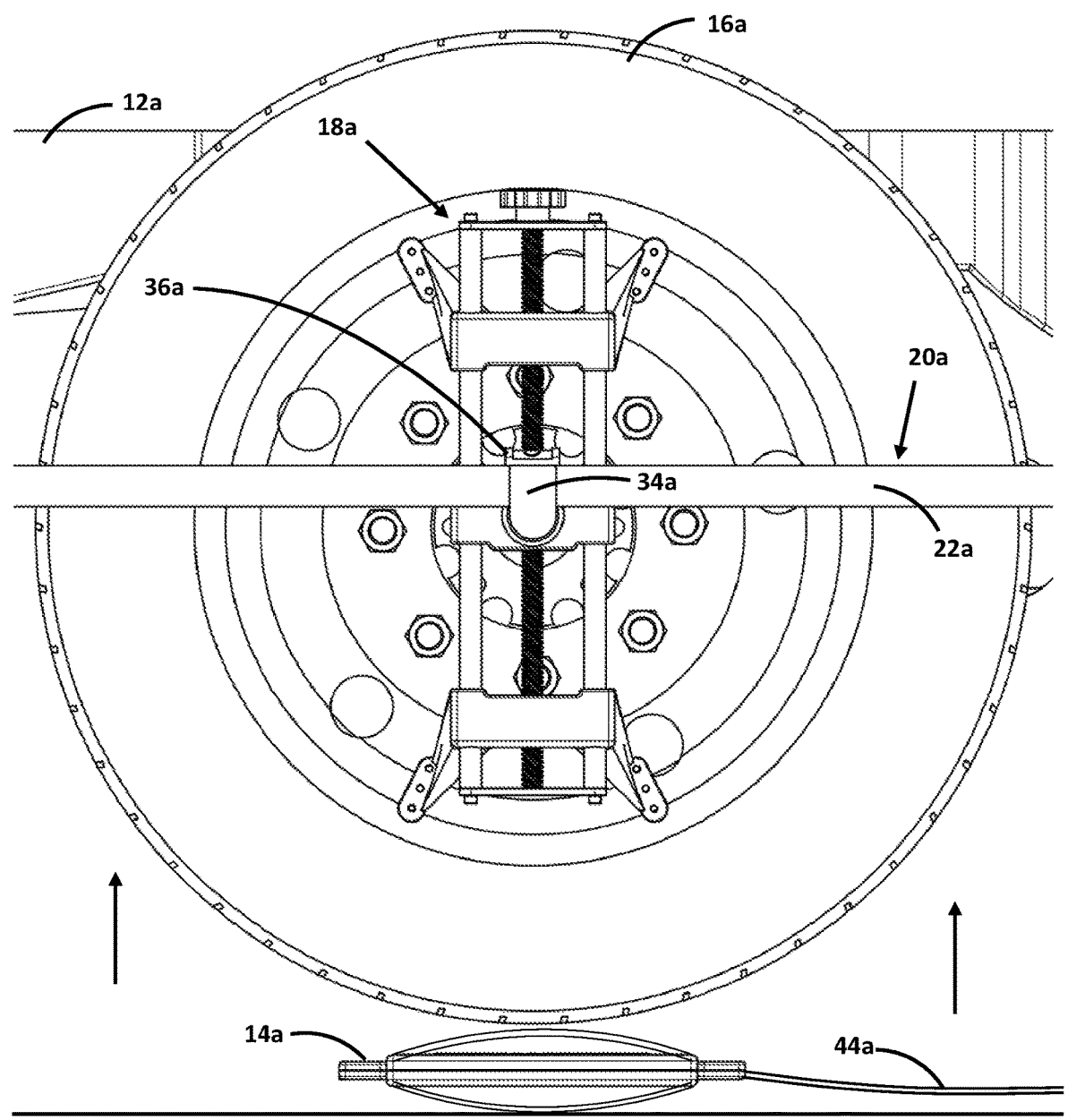
FIG. 15 is a front view of the vehicle leveling device of FIG. 14 after being leveled with an air bag lifting jack.
Figure 16:
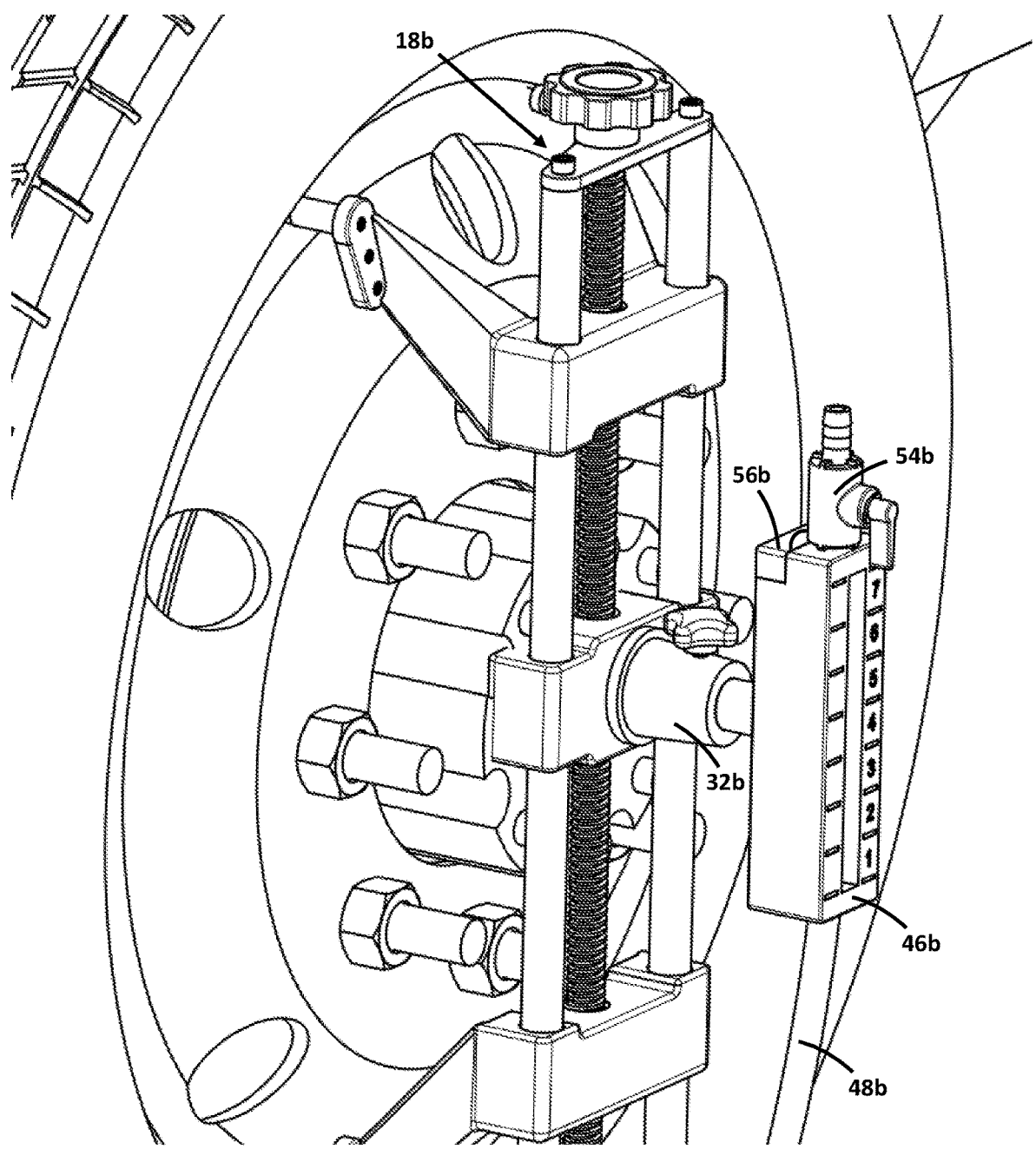
FIG. 16 is a close-up perspective view of another embodiment of mounting clamp having a liquid level indicator.

The lifting jack 14 shown in FIGS. 11 and 12 is mechanically actuated and may be any known lifting jack available. Other types of lifting jacks that are mechanically, pneumatically, or hydraulically actuated to lift each wheel may also be used. Some sensor calibration procedure guidelines will advise that no metal should be contacting the wheel so of the vehicle. In these instances, FIGS. 13-15 show an embodiment of lifting jacks 14a that are inflatable Kevlar mats that have a fluid connector 42a that is connected to a source of pressurized fluid through a hose 44a. But adding pressurized air to the lifting jack 14a, the height of each wheel 16a may be adjusted without extra metal touching the wheel. These Kevlar mat lifting jacks 14a have the added advantage of having a lower profile than traditional jacks and can be easily driven onto and off of as needed.

Figure 17:
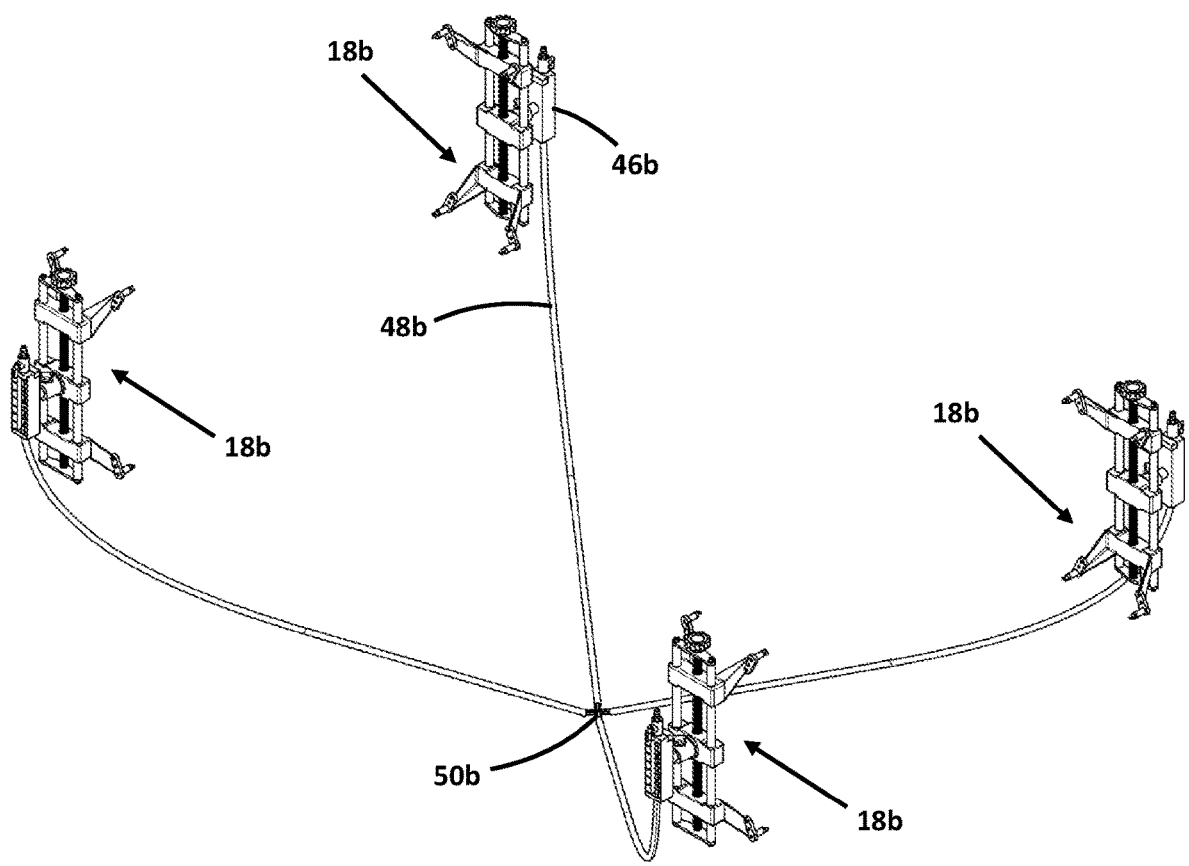
FIG. 17 is a perspective view illustrating how the water level indicators on the mounting clamps may be in fluid connection with each other.
Figure 18:
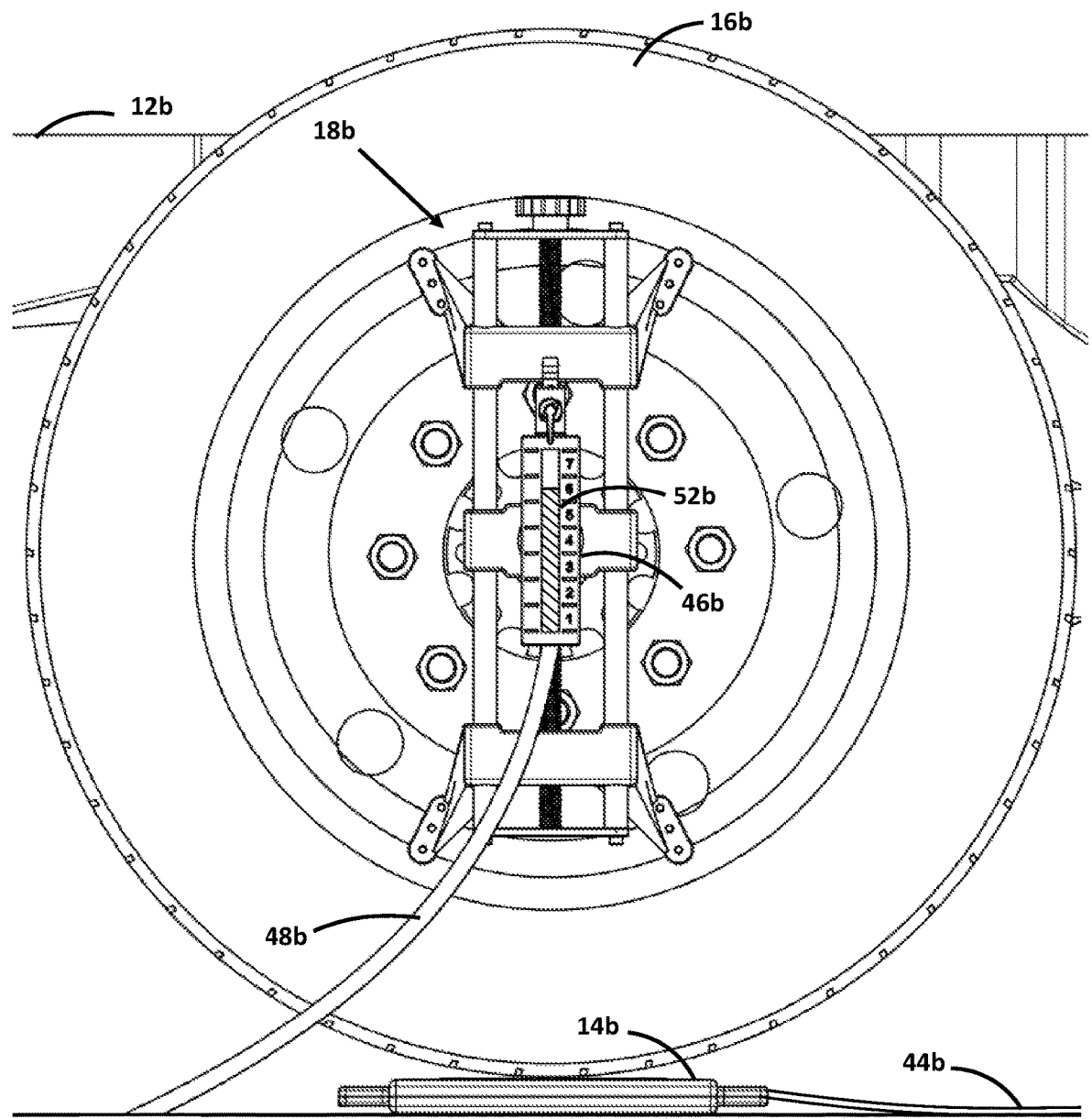
FIG. 18 is a front view of an embodiment of leveling device with a liquid level indicator mounted on a wheel before being leveled with an air bag lifting jack.

FIGS. 16-19 show another embodiment of vehicle leveling device 10b in which the support member 32b holds an indicator 46b for a liquid level that is in fluid connection through a series of hoses 48b with the other indicators on all other mounting clamps 32b on each of the other wheels 16b of the vehicle 12b. As shown in FIG. 17, a four-way connector 50b could be used to connect the hose 48b of each indicator. As shown in FIG. 18, enough liquid 52b is added to the hoses 48b that a level reading can be taken at each indicator. The liquid 52b may be water, antifreeze, or alcohol. A dye may be added to make the liquid 52b easier to see in the indicators 46b. A shutoff valve 54b may be added to the indicator to equalize the pressure in the hoses 48b and to maintain the liquid 52b in the hoses 48b when the vehicle leveling device 10b is not in use. The shutoff valves 54b could also be used to drain or fill the hoses 48b with liquid 52b as needed. A bubble level 56b is incorporated at the top of each indicator 46b to ensure that to ensure that each indicator 46b is completely vertical.

Figure 19:
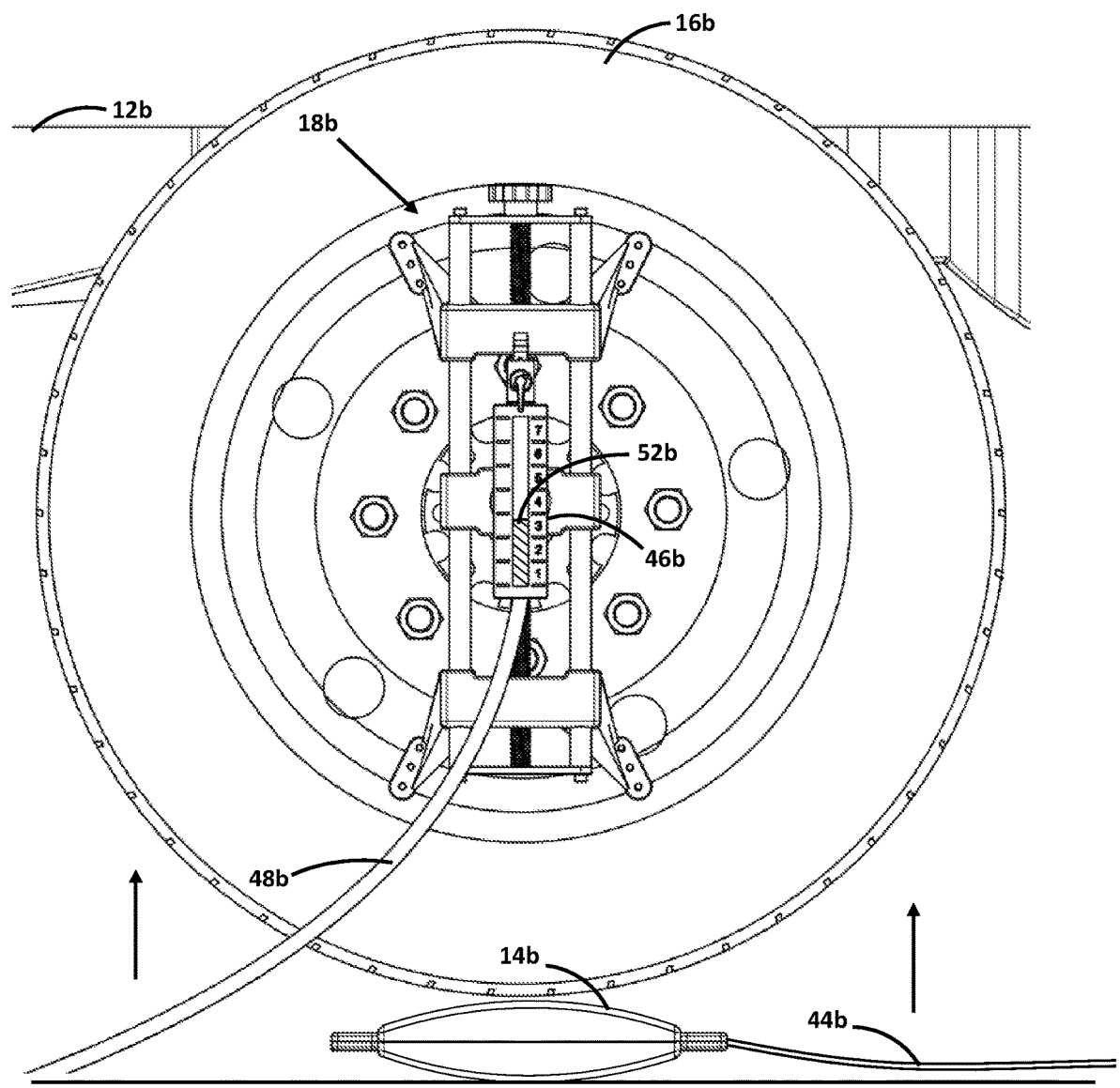
FIG. 19 is a front view of the leveling device of FIG. 18 after being leveled with the air bag lifting jack.

As best understood by referring to FIGS. 18 and 19, the leveling device 10b is operated similarly to the earlier embodiments. First a lifting jack 14b is placed under each wheel 16b of the vehicle 12b. A mounting clamp 18b is installed on the rim of each wheel 16b such that the support member 32b is centered with each wheel. Once all the mounting clamps 18b are secured to the wheels 16b, the shutoff valves 54b are opened and the liquid 52b levels are allowed to settle. If needed, additional liquid 52b is added to the hoses 48b until a level reading can be taken at each indicator 46b. If each indicator 46b shows a different level of liquid 52b, each lifting jack 14b may be actuated under each wheel 16b until the indicators 46b show the same level of liquid 52b indicating that each wheel 16b is coplanar and the vehicle 12b is level as shown in FIG. 19. Preferably, each lifting jack 14b is actuated to move a small amount each time. Once levelled, the lifting jacks 14b are left in place, if present, the shutoff valves 54b are turned off and the mounting clamps 18b are removed from the wheels 16b. The technician may then calibrate the onboard sensors in the vehicle 12b.

Figure 20:
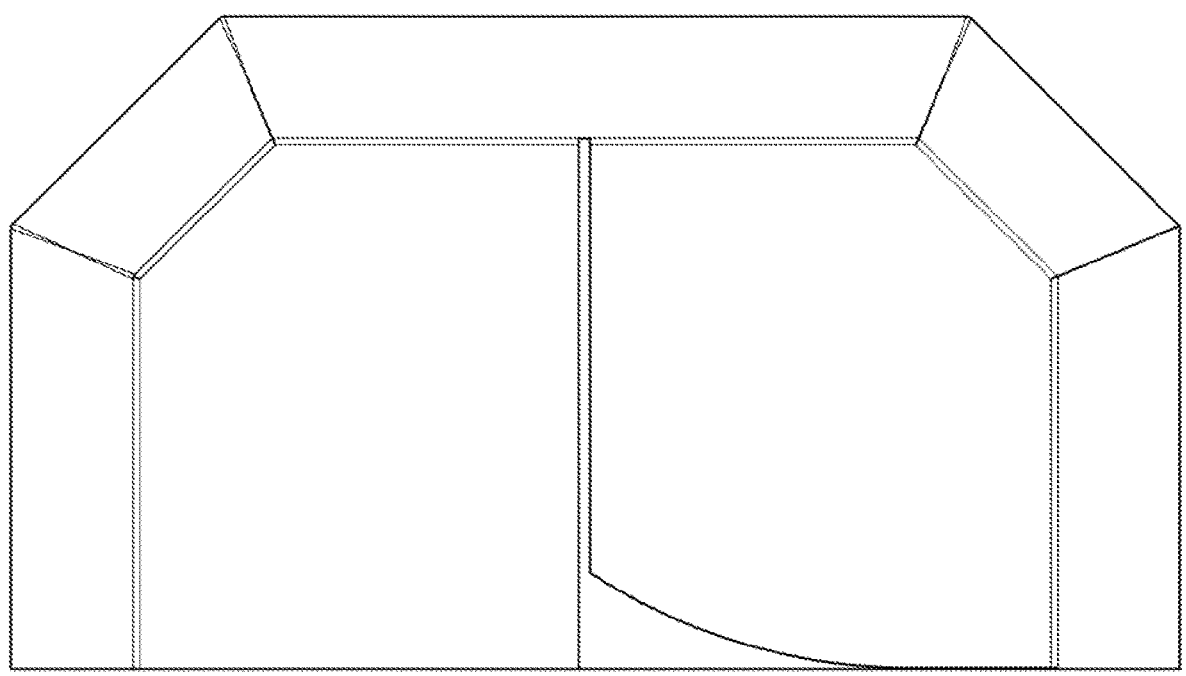
FIG. 20 is a front view of a work booth in which levelling devices can be use for vehicle sensor calibration.
Figure 21:
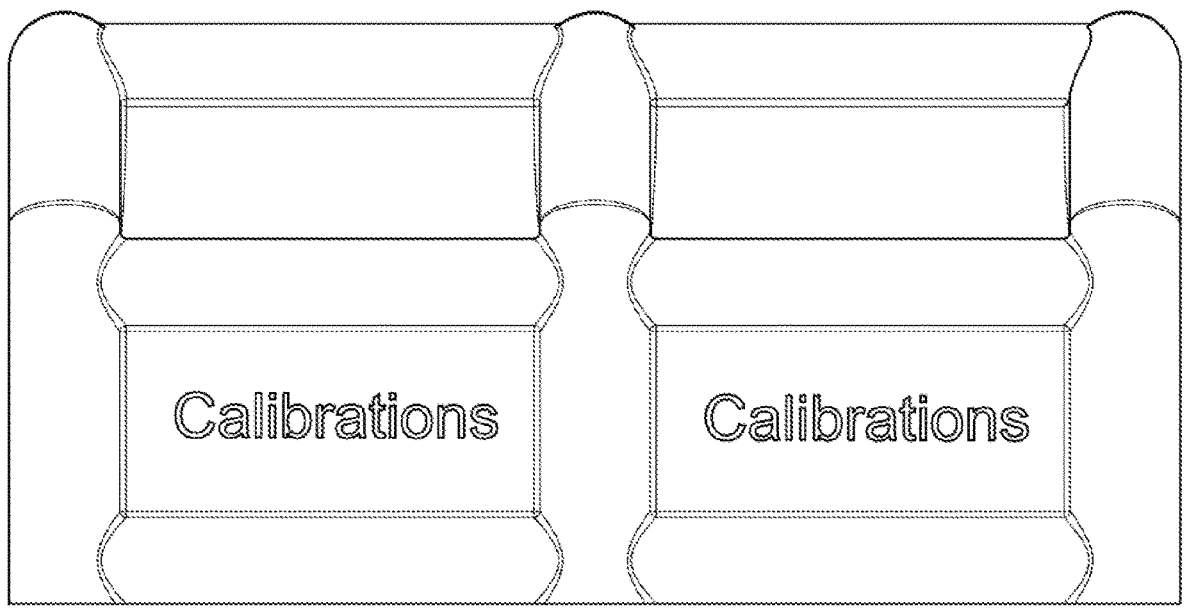
FIG. 21 is a side view of the work booth of FIG. 20.
Figure 22:
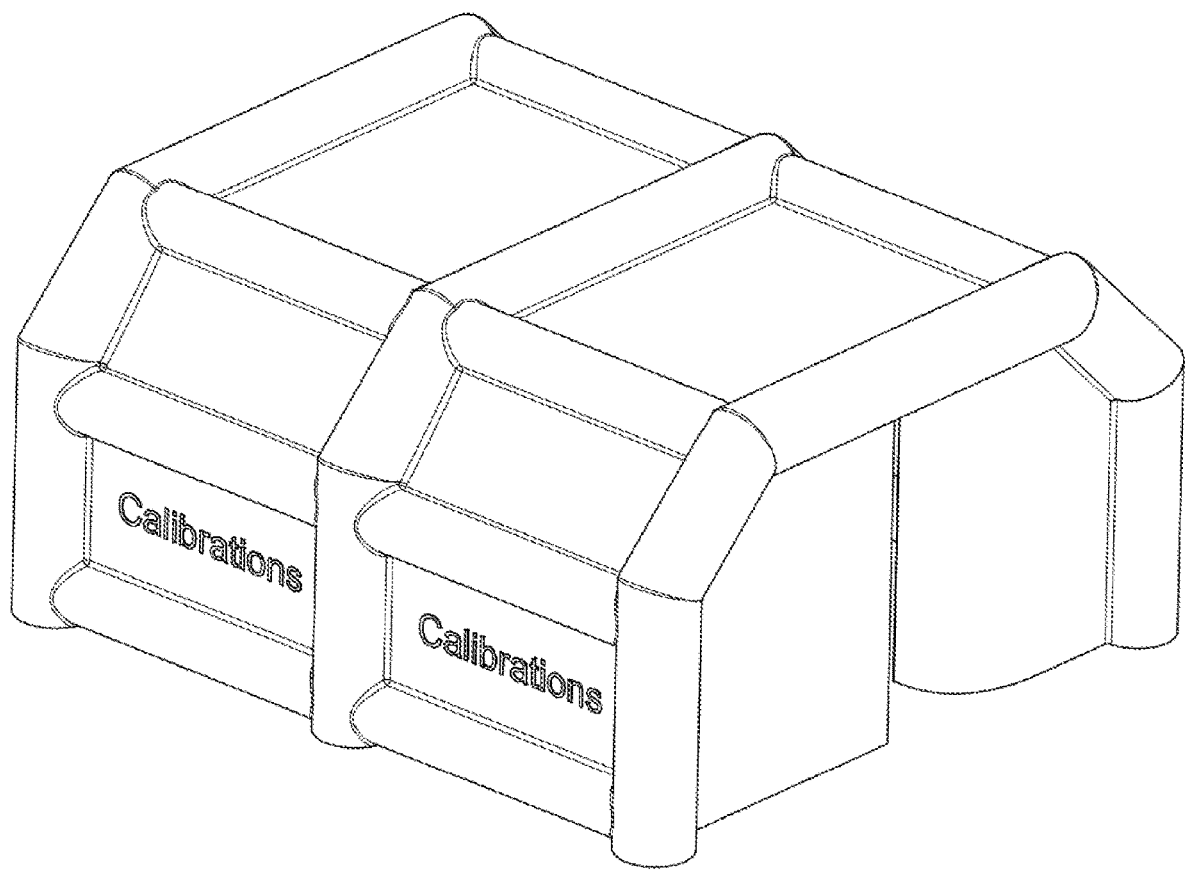
FIG. 22 is a perspective view of the work booth of FIG. 20.

The systems and method disclosed herein allows a vehicle to be leveled on unlevel or rough surfaces that were previously not suitable for vehicle sensor calibration. Many repair shops simply not do these calibrations can now do so in any space that fits other environmental conditions required for sensor calibration. Even with this system, it may not be possible to meet the room requirements. In which case, the systems disclosed herein could be part of a mobile inflatable work booth 58c as shown in FIGS. 20, 21, and 22. This work booth 58c is sized to meet the minimum space requirements for sensor calibration of 30 feet by 30 feet with a ceiling clearance of 17 feet which is more than sufficient clearance for most vehicles. As an inflatable booth, there would be no metal to interfere with the sensor and the colors can be picked as needed but the interior would be white or tan colored walls and neutral colored floors and controlled lighting. Such a work booth 58c could be transported to a work site or set up and dismantled as needed.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. A vehicle leveling device for ensuring that a vehicle is level for calibration of sensors that are installed on the vehicle, wherein the vehicle comprises a plurality of wheels, the vehicle leveling device comprising:
    a lifting jack under each of the vehicle's wheels;
    a mounting clamp for mounting to each of the vehicle's wheels, each said mounting clamp further comprising:
        a sizing frame having two ends;
        a clamping member slidably mounted upon each end of said sizing frame;
        each said clamping member having at least two pivotally mounted engagement hooks;
        an actuating member on said sizing frame which draws said clamping members towards or away from each other such that said engagement hooks may grip or release the rim of the wheel to which said mounting clamp is mounted; and
        a support member mounted central to said sizing frame;
    a telescoping leveling frame comprising:
        a series of interlocking tubes arranged to form a frame that surrounds the vehicle;
        said telescoping leveling frame mounted to each said support member of each said mounting clamp; and
        a plurality of bubble levels mounted to said telescoping leveling frame; and
    wherein said lifting jacks may be actuated under each of the vehicle's wheels such that each bubble level on the leveling frame becomes centered indicating that each wheel is coplanar and the vehicle is level.

2. The vehicle leveling device of claim 1 further comprising said bubble levels are slidably mounted onto said telescoping leveling frame.

3. The vehicle leveling device of claim 1 further comprising said lifting jack may be mechanically, pneumatically, or hydraulically actuated to lift each wheel.

4. The vehicle leveling device of claim 1 further comprising said clamping members are mechanically, pneumatically, or hydraulically actuated towards or away from each other.

5. The vehicle leveling device of claim 1 in which said telescoping leveling frame further comprising pins and holes for adjustment of said telescoping leveling frame around the vehicle.

6. A vehicle leveling device for ensuring that a vehicle is level for calibration of sensors that are installed on the vehicle, wherein the vehicle comprises a plurality of wheels, the vehicle leveling device comprising:
    a lifting jack under each of the vehicle's wheels;
    a mounting clamp for mounting to each of the vehicle's wheels, each said mounting clamp further comprising:
        a sizing frame having two ends;
        a clamping member slidably mounted upon each end of said sizing frame;
        each said clamping member having at least two pivotally mounted engagement hooks;
        an actuating member on said sizing frame which draws said clamping members towards or away from each other such that said engagement hooks may grip or release the rim of the wheel to which said mounting clamp is mounted; and
        a support member mounted central to said sizing frame that supports an indicator for a liquid level that is in fluid connection with the other said indicators on all other said mounting clamps on each of the vehicle's other wheels with enough liquid that a level reading can be taken at each indicator; and
    wherein said lifting jacks may be actuated under each of the vehicle's wheels such that the height of the liquid in each said indicator is equal signifying that each wheel is coplanar and the vehicle is level.

7. The vehicle leveling device of claim 6 further comprising each said indicator has a bubble level to ensure that said indicator is completely vertical.

8. The vehicle leveling device of claim 6 further comprising said lifting jack may be mechanically, pneumatically, or hydraulically to lift each wheel.

9. The vehicle leveling device of claim 1 further comprising said clamping members are mechanically, pneumatically, or hydraulically actuated towards or away from each other.

10. The vehicle leveling device of claim 1 further comprising said liquid is water, antifreeze, or alcohol.

11. The vehicle leveling device of claim 1 further comprising said liquid is colored.

12. The vehicle leveling device of claim 1 further comprising each said indicators are in fluid connection with each other with a series of hoses connected to each said indicator.

13. The vehicle leveling device of claim 1 further comprising each said indicator incorporating a shutoff valve to drain or add said liquid to the vehicle leveling device.

14. A method for ensuring that a vehicle is level for calibration of sensors that are installed on the vehicle, wherein the vehicle comprises a plurality of wheels, comprising the steps of:

placing a lifting jack under each of the vehicle's wheels;

attaching a mounting clamp to each of the vehicle's wheels wherein each mounting clamp has a sizing frame having two ends, a clamping member slidably mounted upon each end of the sizing frame each comprising at least two pivotally mounted engagement hooks, an actuating member on the sizing frame which draws the clamping members towards or away from each other such that the engagement hooks may grip or release the rim of the wheel to which the mounting clamp is mounted, and a support member mounted central to the sizing frame;

mounting of a telescoping leveling frame onto the support members of the mounting clamp on each of the vehicle's wheels wherein a telescopic leveling frame has a series of interlocking tubes arranged to form a frame that surrounds the vehicle and a plurality of bubble levels are mounted to the frame;

actuating the lifting jacks under each of the vehicle's wheels until each bubble level on the leveling frame becomes centered indicating that each wheel is coplanar and the vehicle is level.

15. A method for ensuring that a vehicle is level for calibration of sensors that are installed on the vehicle, wherein the vehicle comprises a plurality of wheels, comprising the steps of:

placing a lifting jack under each of the vehicle's wheels;

attaching a mounting clamp to each of the vehicle's wheels wherein each mounting clamp has a sizing frame having two ends, a clamping member slidably mounted upon each end of the sizing frame each comprising at least two pivotally mounted engagement hooks, an actuating member on the sizing frame which draws the clamping members towards or away from each other such that the engagement hooks may grip or release the rim of the wheel to which the mounting clamp is mounted, and a support member mounted central to the sizing frame that supports an indicator for a liquid level that is in fluid connection with the other indicators on all other mounting clamps on each of the vehicle's other wheels;

filling the indicators with enough liquid that a level reading can be taken at each indicator;

actuating the lifting jacks under each of the vehicle's wheels until the height of the liquid in each indicator is equal to each other signifying that each wheel is coplanar and the vehicle is level.

\* \* \* \* \*